United States Patent Office 3,396,147
Patented Aug. 6, 1968

3,396,147
EPOXY RESIN COMPOSITIONS OF MATTER
Robert M. Lusskin, Neenah, Wis., Frank Backer, Albany, N.Y., and John R. Larson, Upper Saddle River, N.J., assignors to Universal Oil Products Company, Des Plaines, Ill., a corporation of Delaware
No Drawing. Original application Sept. 26, 1963, Ser. No. 311,620. Divided and this application Feb. 13, 1967, Ser. No. 615,346
7 Claims. (Cl. 260—47)

ABSTRACT OF THE DISCLOSURE

The polymers comprise the reaction product of an epoxy resin with a halo-substituted polyhydromethanonaphthalenedicarboxylic acid or anhydride thereof, said polymers possessing desirable physical characteristics such as fire retardance and color stability.

---

This application is a division of our copending application Ser. No. 311,620, filed Sept. 26, 1963, now abandoned.

This invention relates to polymeric compositions of matter and particularly to polymeric compositions of matter containing, as one component thereof, a polyhalopolyhydromethanonaphthalenedicarboxylic acid or anhydride thereof.

The polymeric compositions of matter which are prepared according to the process of this invention in a manner hereinafter set forth in greater detail will possess many particular and desirable physical properties which make these particular compounds desirable and commercially attractive. For example, the polymers which may be prepared by treating a prepolymer with a polyhalopolyhydromethanonaphthalenedicarboxylic acid or anhydride thereof will possess fire retardant properties superior, in many instances, to other polymeric compositions of matter now in use. This property will be found to be of special advantage when preparing plastic materials to be utilized in places subject to excessive heat or possible flames, such uses including architectural panelling for construction work, ash trays, wall plugs for electrical connections, insulation, etc. where the aforementioned fire resistance is a primary concern. Furthermore, by utilizing a polyhalopolyhydromethanonaphthalenedicarboxylic acid or anhydride thereof as a constituent in the finished polymer, said product will be resistant to a large extent, to discoloration as compared with polymeric products which have been prepared utilizing other chlorinated cyclic derivatives. The acid or anhydride, due to its stability, and resistance to deterioration, will thus make it an attractive constituent of plastic materials or polymers which are colorless and should remain so, or which are colored and will not darken, lighten or turn another color.

The color stability of products derived from polyhalopolyhydroalkanonaphthalenedicarboxylic acids and anhydrides thereof compared with similar compounds not containing the cyclohexane ring would not be expected based on current theoretical reasoning. Because alkylated cyclohexanes are known to undergo autoxidation readily, it might be predicted that polyhalopolyhydroalkanonaphthalenedicarboxylic acids and anhydrides thereof would be rapidly attacked by atmospheric oxygen and susceptible to free radical reactions catalyzed by light. Such attack should lead initially to hydroperoxide formation at the various ring junctions as well as at the positions alpha to the carboxyl groups. Decomposition of the hydroperoxides would lead to formation of alcohols, ketones, olefins, ring opening and further attack on the susceptible methylene carbon atoms. The products of these reactions which might be aromatic compounds, quinones and condensed materials would liberate hydrogen chloride and form highly colored products. The reason that these processes fail to occur with polyhalopolyhydroalkanonaphthalenedicarboxylic acids and anhydrides thereof has not been proven at this time. The term "prepolymer" as used hereinafter in the present specification and appended claims will refer to compositions of matter, comprising the reaction product of polymerizable monomers, containing reactive functional substituents which will react with the polyhalopolyhydromethanonaphthalenedicarboxylic acid or anhydride thereof in a chemical manner to thus prepare the finished and desired composition of matter.

It is therefore an object of this invention to provide novel compositions of matter which possess desirable properties of flame retardancy and high color stability.

Another object of this invention is to provide novel compositions of matter by reacting certain prepolymeric compounds with a polyhalopolyhydromethanonaphthalenedicarboxylic acid or anhydride thereof to prepare compounds possessing valuable physical properties.

Taken in its broadest aspect, one embodiment of this invention resides in a composition of matter comprising the reaction product of a polymer containing at least one reactive functional group with a compound selected from the group consisting of polyhalopolyhydromethanonaphthalenedicarboxylic acids and anhydrides thereof.

A further embodiment of this invention is found in a composition of matter comprising the reaction product of a polymer containing at least one reactive functional group and 5,6,7,8,9,9 - hexachloro - 1,2,3,4,4a,5,8,8a-octahydro-5,8-methano-2,3-naphthalenedicarboxylic acid.

Other objects and embodiments will be found in the following further detailed description of this invention.

As hereinbefore set forth, it has now been discovered that polyhalopolyhydromethanonaphthalenedicarboxylic acids or anhydrides thereof of the type hereinafter set forth in greater detail, may be reacted with prepolymeric compositions of matter to form finished polymers which will possess desired physical properties. Examples of prepolymers which will contain at least one reactive functional group, said reactive functional group being capable of reacting with a polyhalopolyhydromethanonaphthalenedicarboxylic acid or anhydride thereof to form the desired product, will include polymers generically referred to as epoxy resins. The particular polyhalopolyhydromethanonaphthalenedicarboxylic acid or anhydride thereof will act to a certain extent as a curing agent or cross-linking agent and thus, enable the finished product to possess the desired physical characteristics and stability to possible deterioration, a particular example of this being a superior stability against discoloration due to deterioration of the particular polymeric product as compared to other products utilizing chlorinated compounds which add fire retardance to the finished product, but not color stability. By utilizing a polyhalopolyhydromethanonaphthalenedicarboxylic acid or anhydride thereof of the type hereinafter set forth in greater detail, the finished product, as hereinbefore set forth, will possess a relatively high resistance to discoloration due to the structural configuration of the acid or anhydride which is used as the curing agent or cross-linking agent.

The polyhalopolyhydromethanonaphthalenedicarboxylic acid or anhydride thereof which comprises one ingredient the finished product may be prepared in any suitable manner, one method being the two step process which comprises first effecting a Diels-Alder reaction of a conjugated aliphatic diene with an olefinic dicarboxylic acid. Examples of conjugated aliphatic dienes which may be used include 1,3-butadiene (hereinafter referred to as butadiene), 2-methyl-1,3-butadiene (isoprene), 1,3-pentadiene (piperylene), 1,3-hexadiene, etc. Olefinic dicarboxylic acids which may be used include maleic acid, fumaric acid, itaconic acid, etc. It is contemplated within the scope of this invention that the term "olefinic dicarboxylic acids" may also include their intramolecular dehydration products such as, for example, maleic anhydride, etc. The Diels-Alder condensation between the conjugated aliphatic diene and the unsaturated dicarboxylic acid will take place at an elevated temperature in the range of from about 80° to about 250° C. or more and at a pressure sufficient to maintain a major portion of the reactants in a liquid phase, said pressure being in a range of from about atmospheric to about 100 atmospheres or more.

The tetrahydrophthalic acid, anhydride or homologue thereof which result from the aforementioned condensation is then further condensed with a conjugated halocycloalkadiene to form the desired product. Examples of halo-substituted cycloalkadienes which may be used include chloro-substituted 1,3-cyclopentadienes (hereinafter referred to as cyclopentadiene) such as tetrachlorocyclopentadiene, pentadichlorocyclopentadiene, hexachlorocyclopentadiene, etc. Other cycloalkadienes containing halogen substituents which may be used include pentabromocyclopentadiene, hexabromocyclopentadiene, etc. The second condensation reaction is also the Diels-Alder type and may be effected at elevated temperature in the range of from about 50° to about 250° C. and at atmospheric or superatmospheric pressures ranging up to about 100 atmospheres or more, the pressure being such as to maintain a major portion of the reactants in the liquid phase at the reaction temperature. If so desired, both Diels-Alder condensation may be effected in the presence of an inert organic solvent, including aromatic solvents such as benzene, toluene, o-xylene, m-xylene, p-xylene, etc.; saturated paraffins and cycloparaffins such as pentane, hexene, heptane, cyclopentane, methylcyclopentane, etc.

Examples of polyhalopolyhydromethanonaphthalenedicarboxylic acids or anhydrides thereof which may be prepared include 5,6,7,8,9,9-hexachloro-1,2,3,4,4a,5,8,8a-octahydro-5,8-methano-2,3-naphthalenedicarboxylic acid,
5,6,7,8,9,9-hexachloro-1,2,3,4,4a,5,8,8a-octahydro-5,8-methano-2,3-naphthalenedicarboxylic anhydride,
5,6,7,8,9,9,-hexabromo-1,2,3,4,4a,5,8,8a-octahydro-5,8-methano-2,3-naphthalenedicarboxylic acid,
5,6,7,8,9,9-hexabromo-1,2,3,4,4a,5,8,8a-octahydro-5,8-methano-2,3-naphthalenedicarboxylic anhydride, etc.

As hereinbefore set forth, the aforementioned polyhalopolyhydromethanonaphthalenedicarboxylic acids or anhydrides thereof are reacted with certain polymeric compositions of matter containing at least one reactive functional group. An example of these polymeric products comprises epoxy resins which may be cured by the addition of the polyhalopolyhydromethanonaphthalenedicarboxylic anhydride. The resin in an uncured state are thermoplastic and may range from low viscosity liquids to high melting point brittle solids. Examples of epoxy resins include the condensation product of epichlorohydrin and bis-phenol, epoxidized oils, olefins, etc. The aforementioned anhydride will react with the epoxy resin by condensing with the reactive epoxy or oxirane group present in the molecule to form a cross-linked tridimensional structure. By utilizing the particular polyhalopolyhydromethanonaphthalenedicarboxylic anhydride, the resultant product will be stable in regard to color, said stability being of particular advantage when utilizing the resins for certain specific purposes, such as floor surfacing, coating, etc.

The prepolymers of the type hereinbefore set forth which contain an excess of at least one reactive functional group, and the polyhalopolyhydromethanonaphthalenedicarboxylic acid or anhydride thereof may be reacted in any manner known in the art, the reaction conditions such as temperature and pressure being dependent upon the particular compounds undergoing curing or cross-linking. Usually the curing or cross-linking of the prepolymer with the particular acid or anhydride thereof will be effected at temperatures ranging from room temperature (about 25° C.) up to about 300° C. or more. In addition, the acid or anhydride thereof will be present in the finished reaction product in various concentrations, ranging from about 5% to about 50% or more of the finished product, the particular concentration again being dependent upon the particular use to which the finished polymeric product will be put.

The following example is given to illustrate the process of the present invention which, however, is not intended to limit the generally broad scope of the present invention in strict accordance therewith.

Example I

An epoxy resin is prepared by condensing epichlorhydrin and bis-phenol. The resin is liquid at room temperature and is cured by placing the resin and an equimolecular amount of 5,6,7,8,9,9-hexachloro-1,2,3,4,4a,5,8,-8a - octahydro - 5,5 - methano - 2,3 - naphthalenedicarboxylic anhydride in an apparatus provided with heating means. The mixture is slowly heated and poured into a glass mold where it is cured at a temperature of about 150° C. for approximately 6 hours.

The cured epoxy resin has a hardness as measured by a Shore Durometer of about 82. The resin is subjected to the direct action of a flame and shows an excellent flame retardancy by not burning when removed from the direct action of the flame, said cured resin being self-extinguishing. In addition, the cured resin possesses excellent color stability when it is compared to another epoxy resin which is cured by treatment with a curing agent comprising a chlorinated cyclic compound which does not contain the specific structure of the compounds of the present invention, particularly the absence of a cyclohexane ring.

We claim as our invention:

1. A composition of matter comprising the reaction product formed at a temperature in the range of from about 25° C. to about 300° C., of an epoxy resin having a plurality of oxirane groups with a compound selected from the group consisting of polyhalopolyhydromethanonaphthalenedicarboxylic acids or anhydrides thereof.

2. The composition of matter set forth in claim 1, further characterized in that said acid or anhydride is present in an amount of from about 5% to about 50% by weight of the finished product.

3. The composition of matter set forth in claim 1, further characterized in that said acid comprises 5,6,7,8,9,9 - hexachloro - 1,2,3,3,4,4a,5,8,8a - octahydro-5,8 - methano - 2,3 - naphthalenedicarboxylic acid.

4. The composition of matter set forth in claim 1, further characterized in that said anhydride comprises 5,6,7,8,9,9 - hexachloro - 1,2,3,4,4a,5,8,8a - octahydro-5,8 - methano - 2,3 - naphthalenedicarboxylic anhydride.

5. The composition of matter set forth in claim 1, further characterized in that said acid comprises 5,6,7,8,9,9 - hexabromo - 1,2,3,4,4a,5,8,8a - octahydro-5,8 - methano - 2,3 - naphthalenedicarboxylic acid.

6. The composition of matter set forth in claim 1, further characterized in that said acid comprises 5,6,7,8,9,9 - hexabromo - 1,2,3,4,4a,5,8,8a - octahydro-5,8 - methano - 2,3 - naphthalenedicarboxylic anhydride.

7. The composition of matter set forth in claim 1, further characterized in that said epoxy resin is formed by the condensation of epichlorhydrin and bis-phenol.

References Cited

UNITED STATES PATENTS 2,744,845   5/1956   Rudoff.

WILLIAM H. SHORT, *Primary Examiner.*

T. D. KERWIN, *Assistant Examiner.*